UNITED STATES PATENT OFFICE.

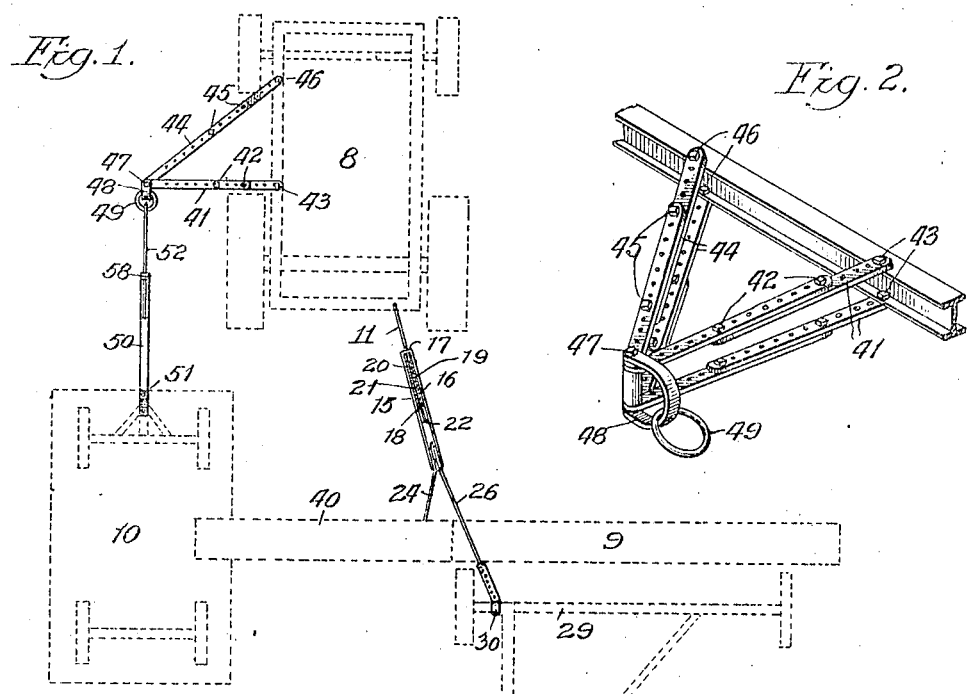
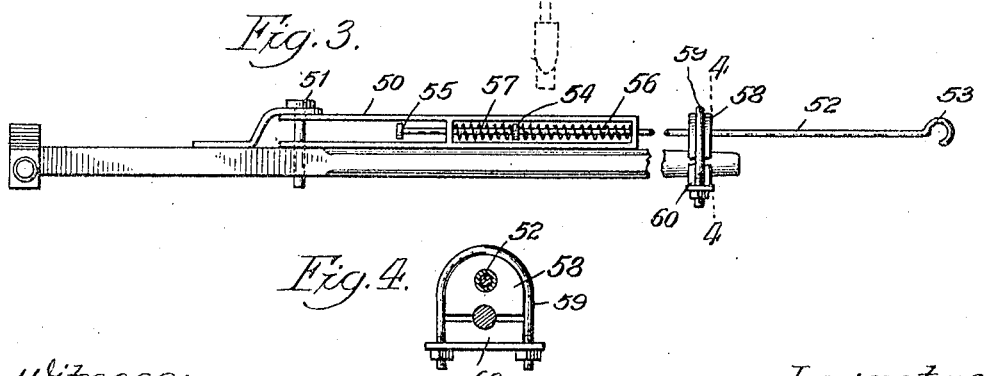

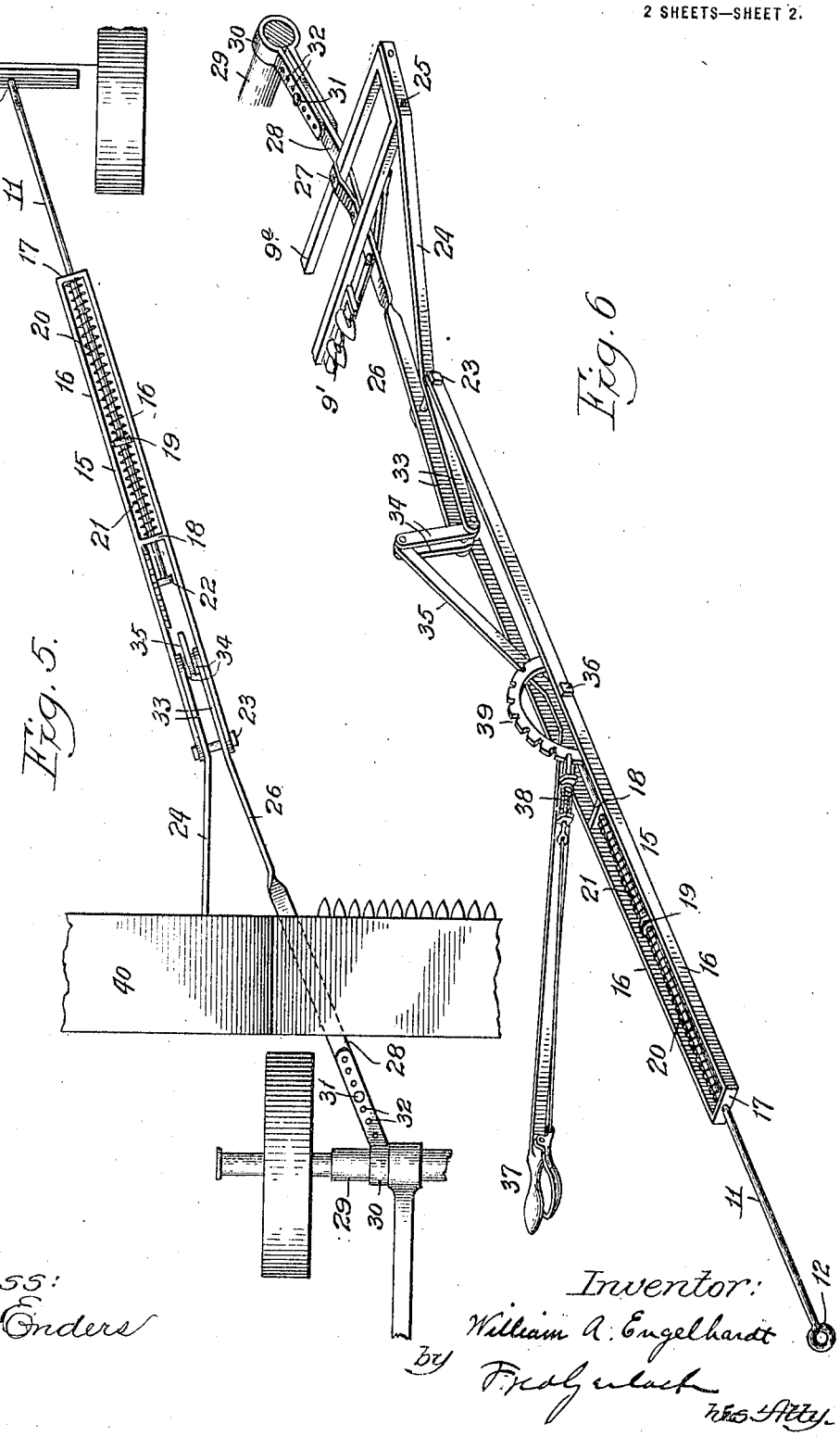

WILLIAM A. ENGELHARDT, OF OAKLEY, KANSAS.

DRAFT CONNECTION FOR TRACTORS.

1,291,813.  Specification of Letters Patent.  Patented Jan. 21, 1919.

Application filed June 28, 1917. Serial No. 177,487.

*To all whom it may concern:*

Be it known that I, WILLIAM A. ENGELHARDT, a citizen of the United States, and a resident of Oakley, in the county of Logan and State of Kansas, have invented certain new and useful Improvements in Draft Connections for Tractors, of which the following is a full, clear, and exact description.

The invention relates to draft-connections for tractors whereby a header and a barge for receiving the material from the header will both be drawn by the tractor in coöperative relation.

One object of the invention is to provide an improved draft connection which permits the header to be adjusted to cut the grain at different elevations while the header is being pulled by the tractor.

Another object of the invention is to provide an improved hitch for drawing the barge to which the header delivers the harvested grain.

A still further object of the invention is to provide an improved draft connection for headers and barges which can be conveniently and quickly manipulated to connect or disconnect them from the tractor. Other objects of the invention will appear from the following description.

The invention consists in the several novel features hereinafter set forth and more particularly defined by claims at the conclusion hereof.

In the drawings: Figure 1 is a plan showing the improved draft connections applied to pull a barge and a header. Fig. 2 is a detail perspective of the draft-connection for the barge. Fig. 3 is a detail elevation of the draft-connection for the barge. Fig. 4 is a section taken on line 4—4 of Fig. 3. Fig. 5 is a plan of the draft connection between the tractor and the header and Fig. 6 is a perspective of the same.

The invention is shown as applied to a tractor 8, a header 9, and a barge 10, all of which may be of usual construction, as well understood in the art.

The draft-connection for the header comprises a rod 11, the front end of which is provided with an eye 12 for connection to a suitable device on the tractor frame. This rod 11 is slidably mounted in a draft-member 15 which comprises sides 16, a cross-bar 17 at the front thereof and a connecting cross-bar 18. Rod 11 passes through and is slidably held in cross-bars 17 and 18 of member 15 and is provided with a shoulder or collar 19 between said cross-bars. A coil spring 20 around rod 11 is interposed between shoulder 19 and the cross bar 17 to cushion the pull upon the header and a spring 21 is interposed between the shoulder 19 and cross bar 18 to cushion the back thrust or rebound. At its rear end, the rod 11 is provided with a head 22 which acts as a positive stop under abnormal strains. The rear end of member 15 is pivoted by a bolt 23 to a draft-member which comprises a bar 24 which is secured to the platform-frame of the header, as at 25 and a bar 26, which is rigidly secured to the sickle bar and also secured to said platform-frame by a bolt 27 and is extended rearwardly, as at 28, and there connected to the main axle 29 of the header by a split collar 30 which extends around the axle and is adjustably connected to bar 28 by a bolt 31 and a series of holes 32. This adjustable connection adapts the draft-device to different headers. Bars 24 and 26 are extended forwardly of pivot 22, as at 33, and the front ends of said bars are connected by dual links 34 to the rear end of an adjusting lever 35 which is pivoted, as at 36, to the draft-member 15. Lever 35 has a handle 37 at its front end where it can be conveniently reached by the operator on the tractor. A spring lock 38 and a rack 39 which is fixed to the draft-member 15 are adapted to lock lever 37 in different positions. Lever 37 can be easily raised or lowered, causing it to swing bars 24 and 26 relatively to the draft member 15, so that the cutting mechanism 9' of the header 9, which is mounted on the platform 9ª, may be raised or lowered to vary the elevation at which the grain will be cut. In effecting this adjustment, collar 30 will swing around the axle 29 and rod 11 will swing about its pivotal connection with the tractor, so that the pivot 23 between the draft member 15 and the bars 24, 26 will be raised or lowered and when the lever is locked, the cutting mechanism of the header will be held in correspondingly raised or lowered position. The draft mechanism for the header extends rearwardly and laterally from its point of attachment to the tractor, so that the header can travel on the stubble.

The improved draft device for the barge, which is drawn alongside of header to receive the harvested grain from an elevator 40, which is connected to and operated from the header, as well understood in the art, is adapted for connection to an ordinary wagon tongue, such as is usually provided on the barge for hitching horses thereto. This draft device is connected to an adjustable bracket secured to the tractor to project laterally therefrom, to draw the barge rearwardly of and at one side of the tractor. This adjustable bracket comprises laterally projecting bars 41, each of which is made up of sections provided with holes and bolts 42 by which the length of the bar may be adjusted to bring the point of each at the desired point laterally of the tractor. The inner ends of bars 41 are secured to the frame of the tractor by bolts 43. The outer ends are secured in desired position by extensible diagonal brace bars 44, each of which is built up of perforated sections adjustably secured together by bolts 45. The front ends of brace bars 44 are secured to the tractor frame by bolts 46 and their rear ends are secured to the outer ends of the bars 41 by the king-bolt 47 which also passes through a clevis 48 provided with a hitching ring 49.

The draft connection for the barge comprises member 50, which is adapted to overlie the wagon tongue and to be connected thereto by the pin 51 which is usually employed for connecting the double-tree to the tongue. A rod 52 having a hook 53 at its front end, which is adapted to be hooked into the ring 49, is slidably held in the bar 50, is provided with a shoulder 54 and with a stop 55 at its rear end. A spring 56 is applied to said rod to cushion the pull upon the barge through rod 52 and a spring 57 is applied to a rod to cushion the connection in backing the vehicle or when there is a rebound from the spring 56. In front of the member 50, rod 52 is slidably held in a guide-bracket 58 which is adapted to be clamped to the front end of the tongue by a U-bolt 59 and a clamping member 60. This bracket may be readily applied to any wagon tongue. The draft connection for the barge exemplifies one which is adapted to be readily applied to an ordinary wagon tongue and in which provision is made for a yielding pull upon the barge.

The invention thus exemplifies improved draft connections whereby a header and a barge are adapted to be drawn by a tractor in coöperative relation. Also a draft connection for the header by which a yielding pull will be exerted upon the header and in which provision is made in or on the draft connection for adjusting the cutting mechanism; and which is adapted to be applied to headers which differ in construction. The invention also exemplifies an improved draft connection for a barge in which the point of hitch at the side of the tractor may be varied, and which is adapted to be readily applied to an ordinary wagon tongue and in which provision is made for a yielding pull on the barge.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A draft connection for a header comprising a plurality of longitudinally extending draft members, one having its front end adapted for connection to a tractor and the other having its rear end adapted for connection to a header, a pivotal connection between the members which permits relative movement thereof, and an adjusting lever for relatively adjusting the members to raise or lower the cutter platform of the header, sustained by one of the draft-members and extended forwardly so as to be within reach of the operator on the tractor.

2. A draft connection for a header comprising a plurality of longitudinally extending draft members, one having its front end adapted for connection to a tractor and the other having its rear end adapted for connection to a header, a pivotal connection between the members which permits relative vertical movement thereof, and an adjusting lever pivotally connected to the front draft member and connected to the rear draft member for relatively adjusting the members to raise or lower the cutter platform of the header and extended forwardly so as to be within reach of the operator on the tractor.

3. A draft connection for a header comprising a plurality of longitudinally extending members, the front member being provided with means for connection to a tractor, the rear member comprising a bar having means for attachment to the cutter platform of the header and a bar provided with means for connection to the axle of the header, a connection between the members which permits relative vertical movement, and means for relatively adjusting the members to raise or lower the cutter platform of the header.

WILLIAM A. ENGELHARDT.